(12) United States Patent
Watanabe et al.

(10) Patent No.: US 6,323,926 B2
(45) Date of Patent: Nov. 27, 2001

(54) VERTICAL ALIGNMENT MODE LCD HAVING TWO DIFFERENT ALIGNMENT REGIONS

(75) Inventors: Noriko Watanabe, Nara; Shigeaki Mizushima, Ikoma, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/804,141

(22) Filed: Mar. 13, 2001

(30) Foreign Application Priority Data

Mar. 13, 2000 (JP) .................................................. 12-098056
Jan. 29, 2001 (JP) .................................................. 13-019729

(51) Int. Cl.$^7$ ................................................ G02F 1/1337
(52) U.S. Cl. ........................................... 349/130; 349/129
(58) Field of Search ................................... 349/129, 130, 349/143

(56) References Cited

U.S. PATENT DOCUMENTS

| | | | |
|---|---|---|---|
| 5,666,179 | 9/1997 | Koma | 349/130 |
| 5,689,322 | 11/1997 | Hirata | 349/130 |
| 5,825,448 | * 10/1998 | Bos et al. | 349/130 |
| 6,040,885 | * 3/2000 | Koike et al. | 349/129 |
| 6,115,100 | * 9/2000 | Koma | 349/130 |
| 6,188,456 | * 2/2001 | Koma | 349/130 |

FOREIGN PATENT DOCUMENTS

| | | |
|---|---|---|
| 6-301036 | 10/1994 | (JP) . |
| 7-64092 | 3/1995 | (JP) . |
| 7-230097 | 8/1995 | (JP) . |

OTHER PUBLICATIONS

Koike et al, "A Vertically Aligned LCD Providing Super-High Image Quality", IDW '97, pp. 159–162, 1997.

* cited by examiner

*Primary Examiner*—Toan Ton
(74) *Attorney, Agent, or Firm*—Nixon & Vanderhye, P.C.

(57) ABSTRACT

At least one of alignment films in the liquid crystal display device has a first alignment regulation region provided within each of a plurality of picture-element regions for aligning liquid crystal molecules of a liquid crystal layer approximately vertically, and a second alignment regulation region provided outside the plurality of picture-element regions for aligning the liquid crystal molecules of the liquid crystal layer in a single azimuth direction.

When a voltage is applied to the first alignment regulation region having vertically aligned liquid crystal molecules, these vertically aligned liquid crystal molecules are tilted in the same direction as that of the liquid crystal molecules regulated by the alignment film of the second alignment regulation region. Thus, even in a turned-on state of the vertical alignment liquid crystal display device, uniform alignment is obtained across the entire display plane, so that high-quality display is realized.

7 Claims, 12 Drawing Sheets

VERTICAL ALIGNMENT MODE LCD HAVING TWO DIFFERENT ALIGNMENT REGIONS

BACKGROUND OF THE INVENTION

The present invention relates to a liquid crystal display device (LCD) having excellent display quality and a method for manufacturing the same. More particularly, the present invention relates to a vertical alignment mode LCD having high display quality and a convenient, useful method for manufacturing the same.

Currently, the LCDs are used as display devices for various information processors including personal computers and navigation systems. The current mainstream is TN (Twisted Nematic) mode LCDs, one of the horizontal alignment modes.

In the liquid crystal layer of the TN mode LCDs, liquid crystal molecules having positive dielectric anisotropy are provided between a pair of substrates so as to be aligned approximately horizontally with respect to the substrate surface. The alignment direction of the liquid crystal molecules at one of the substrates is twisted by 90° from that of the liquid crystal molecules at the other substrate. The TN mode LCDs provide display in so-called normally white mode. More specifically, the TN mode LCDs provide white display in a turned-off state, and black display in a turned-on state. However, satisfactory black display is less likely to be obtained with the TN mode LCDS. The reason for this is as follows: in the TN mode LCDs, even in a turned-on state (i.e., when a voltage is applied), the liquid crystal molecules located close to the substrate are not oriented in parallel with an electric field (vertically to the substrate) and maintain their horizontal alignment. Thus, light with its polarization plane rotated by the birefringence of such horizontally aligned liquid crystal molecules passes through the liquid crystal panel.

In recent years, practical applications of vertical alignment mode LCDs have been studied. The vertical alignment mode LCDs are the LCDs in which liquid crystal molecules having negative dielectric anisotropy are aligned vertically to the substrate surface. The vertical alignment mode LCDs are advantageous over the TN mode LCDs in that high-quality black display is more easily obtained and thus high contrast ratio display is more easily realized. In the vertical alignment mode, almost all liquid crystal molecules are aligned approximately vertically to the substrate surface in a turned-off state. Therefore, the liquid crystal layer does not rotate the polarization plane of light, whereby nearly perfect black display can be realized.

However, the vertical alignment mode LCDs have the following problem.

In the vertical alignment mode, the liquid crystal molecules are aligned approximately vertically to the alignment film surface. Therefore, it is difficult to apply the alignment regulation force in an azimuth direction to the liquid crystal molecules. As a result, high-quality white display is less likely to be obtained when the liquid crystal molecules are oriented horizontally (vertically to an electric field) by applying a voltage to the liquid crystal layer. This problem will now be described with reference to FIGS. 11 and 12.

FIG. 11 is a plan view of a conventional vertical alignment LCD 400. FIG. 12 is a cross-sectional view of the LCD 400 in a turned-on state (i.e., when a voltage is applied). FIG. 12 corresponds to a cross-sectional view taken along line 12A–12A' of FIG. 11.

The LCD 400 has a liquid crystal layer 30 between a TFT (Thin Film Transistor) substrate 10 and a color filter substrate 20. The liquid crystal layer 30 has liquid crystal molecules 32 having negative dielectric anisotropy. The TFT substrate 10 has a glass substrate 11, gate lines 12 formed thereon, source lines 14, and picture-element electrodes 18 each connected to a corresponding source line 14 through a corresponding TFT 16. The color filter substrate 20 has a glass substrate 21, a color filter layer 27 formed thereon, and a counter electrode 28. Each of the TFT substrate 10 and the color filter substrate 20 has a vertical alignment film 42 at its surface facing the liquid crystal layer 30. Note that the hatched regions of the color filter layer 27 represent a black matrix.

When the LCD 400 is in the driven state, an electric field (arrow E) is generated between the picture-element electrode 18 and the gate line 12, as shown in FIG. 12. As a result, the liquid crystal molecules 32 located near the gate lines 12 are tilted in the directions shown by arrows A and B according to the intensity of the electric fields. Similarly, in the cross section taken along line 12B–12B' of FIG. 11, the liquid crystal molecules 32 located near the source lines 14 are tilted in response to the electric field generated between the source line 14 and the picture-element electrode 18.

Thus, the liquid crystal molecules 32 located near the gate lines 12 and source lines 14 tend to be tilted in different directions, respectively. In other words, if the liquid crystal molecules 32 are not subjected to alignment regulation in the azimuth direction (the direction defined within the display plane or within the plane of the liquid crystal layer), the liquid crystal molecules 32 located in the corresponding portions tend to be tilted in response to the electric fields, so that four regions are produced where the liquid crystal molecules 32 are oriented in different azimuth directions, respectively. However, these four regions are unstable and also the effect of the electric field in each picture-element region is not necessarily uniform. Therefore, these four regions cannot be formed stably at a desired area ratio in each picture-element region. Such variation in the area ratio of the four regions degrades the display quality. This is visually recognized as unevenness of the display when the LCD is viewed obliquely.

An example of the most common, convenient method for controlling the alignment direction of the liquid crystal molecules (hereinafter, the alignment direction refers to the azimuth alignment direction unless otherwise specified) is a rubbing method in which the alignment film is rubbed to provide a slight tilt angle in the vertical alignment (the tilt angle as used herein is an angle from the normal of the alignment film surface, and indicates displacement from the vertical alignment). In order to obtain the alignment regulation force exceeding the effect of the electric field, a tilt angle of about 3° or more is generally required. However, the vertical alignment film subjected to the rubbing method does not have enough alignment regulation force. Therefore, a stable tilt angle is less likely to be obtained by the rubbing method. In other words, a slight difference in rubbing conditions results in variation in tilt angle of the liquid crystal molecules within the display plane, and this variation in tilt angle is visually recognized as stripe-shaped alignment defects.

Other methods for obtaining the alignment regulation force include a method utilizing an electric field (Japanese Laid-Open Publication Nos. 6-301036 and 7-230097), a method utilizing the effect of uneven shape of the surface facing the liquid crystal layer (IDW '97, p. 159, "A Vertically Aligned LCD Proving Super-High Image Quality"), and the like. However, none of these methods are desirable due to insufficient alignment regulation force, an increased number of manufacturing processes, or the like.

Moreover, Japanese Laid-Open Publication No. 7-64092 discloses a method for preventing generation of a disclination line at the boundary between two or more differently aligned regions within a single picture-element region of the normally white mode TN display. More specifically, a vertically aligned region is formed at the boundary between the differently aligned regions in order to prevent generation of the disclination line. In this method, however, alignment of the picture-element region is partially changed at the vertically aligned region, and the alignment film in the vertically aligned region does not have force to regulate the alignment direction of the liquid crystal molecules and thus does not stabilize the alignment of the liquid crystal molecules in a single direction.

SUMMARY OF THE INVENTION

The present invention is made in view of the aforementioned problems, and it is an object of the present invention to provide a vertical alignment mode liquid crystal display device having high display quality without producing unevenness of the display and alignment defects, and a convenient, useful method for manufacturing the same.

The aforementioned object is achieved by the following liquid crystal display device and method for manufacturing the same. According to the present invention, a liquid crystal display device includes a pair of substrates, a liquid crystal layer provided between the pair of substrates, an electrode for applying a voltage to the liquid crystal layer, and a pair of alignment films formed on respective surfaces of the pair of substrates which face the liquid crystal layer, and has a plurality of picture-element regions for providing display. At least one of the pair of alignment films has a first alignment regulation region provided within each of the plurality of picture-element regions for aligning liquid crystal molecules of the liquid crystal layer approximately vertically, and a second alignment regulation region provided outside the plurality of picture-element regions for aligning the liquid crystal molecules of the liquid crystal layer in a single azimuth direction. Thus, the aforementioned object is achieved.

The liquid crystal molecules in the first alignment regulation region may have a tilt angle in a range of 88° to 90° with respect to a surface of the at least one alignment film, and the liquid crystal molecules in the second alignment regulation region may have a tilt angle in a range of 0° to 87° with respect to the surface of the at least one alignment film.

The at least one alignment film may further have the second alignment regulation region within each of the plurality of picture-element regions.

Preferably, the second alignment regulation region is arranged such that a distance from any point within the first alignment regulation region to the second alignment regulation region is 50 μm or less.

Preferably, the second alignment regulation region is arranged such that a distance to an adjacent second alignment regulation region with a corresponding first alignment regulation region interposed therebetween is 100 μm or less.

The at least one alignment film may have a plurality of second alignment regulation regions, and each of the plurality of second alignment regulation regions may define the same single azimuth direction.

Preferably, both of the pair of alignment films have the first and second alignment regulation regions, and the second alignment regulation region of one of the alignment films is arranged so as to face the second alignment regulation region of the other alignment film with the liquid crystal layer interposed therebetween.

According to the present invention, in a method for manufacturing a liquid crystal display device including a pair of substrates, a liquid crystal layer provided between the pair of substrates, an electrode for applying a voltage to the liquid crystal layer, and a pair of alignment films formed on respective surfaces of the pair of substrates which face the liquid crystal layer, the liquid crystal display device having a plurality of picture-element regions for providing display, wherein at least one of the pair of alignment films has a first alignment regulation region provided within each of the plurality of picture-element regions for aligning liquid crystal molecules of the liquid crystal layer approximately vertically, and a second alignment regulation region provided outside the plurality of picture-element regions for aligning the liquid crystal molecules of the liquid crystal layer in a single azimuth direction, wherein the first and second alignment regulation regions are formed by a process including the steps of forming a vertical alignment film at the surface of the substrate, selectively radiating actinic rays to the vertical alignment film so as to apply to the vertical alignment film a function to align the liquid crystal molecules in an azimuth direction, and rubbing the vertical alignment film. Thus, the aforementioned object is achieved. Preferably, the actinic rays are ultraviolet rays.

Hereinafter, functions of the present invention will be described.

At least one of alignment films in the liquid crystal display device of the present invention has a first alignment regulation region provided within each picture-element region for aligning the liquid crystal molecules approximately vertically, and a second alignment regulation region provided outside the picture-element regions (hereinafter, also referred to as "in a region other than the picture-element regions") for aligning the liquid crystal molecules in a single azimuth direction. The liquid crystal molecules having their alignment direction regulated by the alignment film of the second alignment regulation region regulate the alignment direction of the liquid crystal molecules located near the second alignment regulation region due to the unique continuous property of the liquid crystal (property like continuous matter). Accordingly, when a voltage is applied to the first alignment regulation region having vertically aligned liquid crystal molecules, these vertically aligned liquid crystal molecules are tilted in the same direction as that of the liquid crystal molecules regulated by the alignment film of the second alignment regulation region. Thus, even in the turned-on state of the vertical alignment liquid crystal display device, uniform alignment is obtained across the entire display plane, so that high-quality display is realized.

A tilt angle of the liquid crystal molecules with respect to the alignment film surface in the second alignment regulation region is smaller than that in the first alignment regulation region. More specifically, the alignment regulation force is applied to the liquid crystal molecules such that the tilt angle in the first alignment regulation region falls within the range of 88° to 90° and the tilt angle in the second alignment regulation region falls within the range of 0° to 87°. If the tilt angle in the first alignment regulation region is less than 88°, variation in tilt angle is increased, which may possibly cause non-uniform display, resulting in degraded display quality. On the other hand, if the tilt angle in the second alignment regulation region is larger than 87°, the force to regulate alignment in a single direction is reduced, which may possibly make sufficient alignment regulation impossible.

The second alignment regulation region may be provided not only outside the picture-element regions but also within each of the plurality of picture-element regions. It is preferable to provide the second alignment regulation region also within each picture-element region, because this enables the alignment regulation force applied from the second alignment regulation region to the liquid crystal molecules in the liquid crystal layer to be efficiently transmitted to the vertically aligned liquid crystal molecules in the first alignment regulation region.

In the case where the second alignment regulation region is arranged such that the distance from any point within the first alignment regulation region to the second alignment regulation region is 50 $\mu$m or less, the alignment regulation force of the alignment film in the second alignment regulation region well reaches the liquid crystal molecules within the first alignment regulation region, thereby allowing driving with sufficiently rapid response. In order to obtain stable alignment and sufficiently rapid response, it is preferable that the plurality of second alignment regulation regions define the same alignment direction. By forming the second alignment regulation region in both of the pair of alignment films such that the respective second alignment regulation regions face each other with the liquid crystal layer interposed therebetween, the alignment regulation force of the alignment film in the second alignment regulation region can be applied to the liquid crystal molecules with improved efficiency. Note that the distance from any point within the first alignment regulation region to the second alignment regulation region means the shortest distance from that point within the first alignment regulation region to the boundary between the first and second alignment regulation regions.

The second alignment regulation region of the alignment film may be formed by exposing the surface of the vertical alignment film to a chemical solution such as alkali or acid, or by selectively (partially) radiating actinic rays (hereinafter, also referred to as energy radiation) such as light, electron beams, ion beams, or X rays to the vertical alignment film. In particular, in the case where the second alignment regulation region is formed by partially radiating light to the alignment film, light, laser light or the like need only be radiated through a mask onto the vertical alignment film having the first alignment regulation region. Therefore, increase in the number of processes can be minimized.

Ultraviolet (UV) rays are efficient actinic rays for forming the second alignment regulation region. According to the manufacturing method of the present invention, a uniform tilt angle is applied to the alignment film by a method other than the rubbing method, that is, by radiating actinic rays such as UV rays. As a result, the liquid crystal molecules can be stably aligned in the azimuth direction. Moreover, in the case where these methods are combined with the rubbing method, the rubbing method is conducted so as to apply a tilt angle of 88° to 90° to the vertical alignment film of the first alignment region. Thus, the azimuth direction defined by the second alignment regulation region can be made uniform across the whole display plane without causing any undesirable display as well as alignment defects in the first alignment regulation regions.

DETAILED DESCRIPTION OF THE PREFERRED EMBODIMENTS

Hereinafter, a liquid crystal display device and a method for manufacturing the same according to embodiments of the present invention will be described. The present invention is not limited to the following embodiments.
(Embodiment 1)

Figure 1:
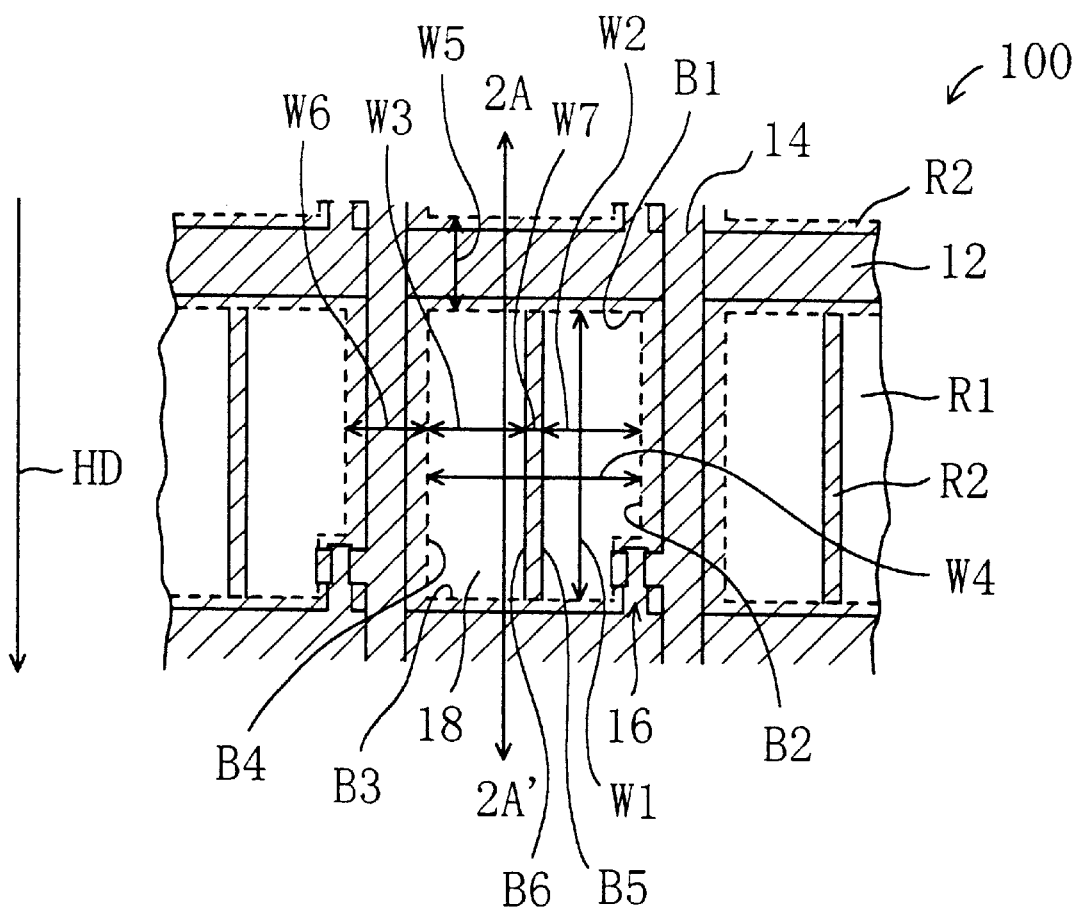
FIG. 1 is a plan view schematically showing picture-element regions of an LCD according to a first embodiment of the present invention.
Figure 2:
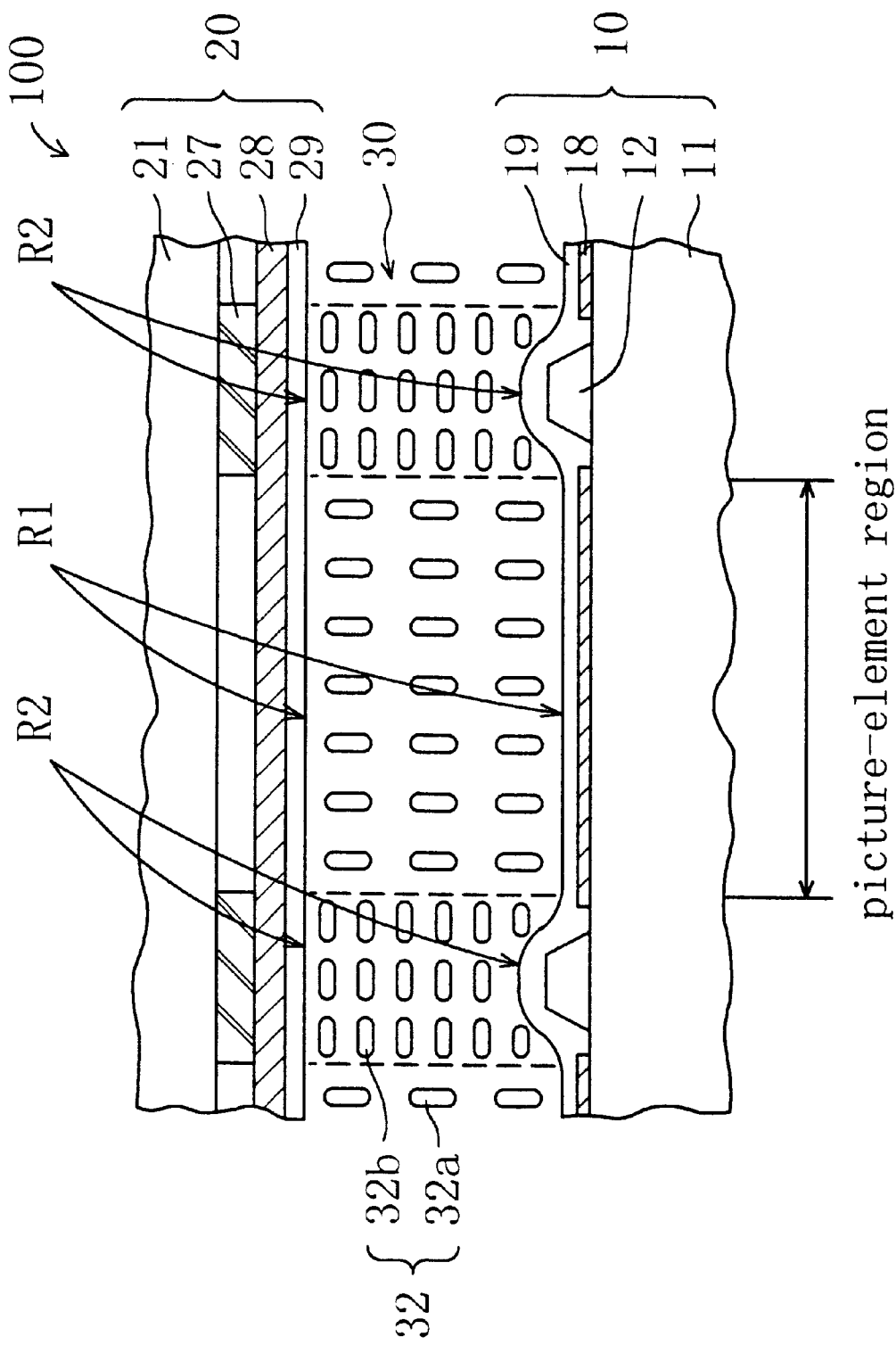
FIG. 2 is a cross-sectional view schematically showing the picture-element region of the LCD according to the first embodiment of the present invention.

FIG. 1 schematically shows a planar structure of picture-element regions of a vertical alignment mode LCD 100 according to the first embodiment. FIG. 2 schematically shows a cross-sectional structure of the picture-element region of the LCD 100. FIG. 2 corresponds to a cross-sectional view taken along line 2A–2A' of FIG. 1. Both figures show the state when a voltage is not applied.

The LCD 100 has a liquid crystal layer 30 between a TFT substrate 10 and a color filter substrate 20. The liquid crystal layer 30 has liquid crystal molecules 32 having negative dielectric anisotropy. The TFT substrate 10 has a glass substrate 11, gate lines 12 formed thereon, source lines 14, and picture-element regions 18 each connected to a corresponding source line 14 through a corresponding TFT 16. The color filter substrate 20 has a glass substrate 21, a color filter layer 27 formed thereon, and a counter electrode 28. Each of the TFT substrate 10 and the color filter substrate 20 has an alignment film 19, 20 at its surface facing the liquid crystal layer 30. Note that the hatched regions of the color filter layer 27 represent a black matrix.

Each of the alignment films 19 and 29 of the LCD 100 has a first alignment regulation region R1 provided within each picture-element region for aligning the liquid crystal molecules 32a of the liquid crystal layer 30 approximately vertically, and a second alignment regulation region R2 provided outside the picture-element regions for aligning the liquid crystal molecules 32b in a single azimuth direction (arrow HD). In this example, both alignment films 19 and 29 have the second alignment regulation region R2 such that the respective second alignment regulation regions R2 of the alignment films 19 and 29 face each other. However, the present invention is not limited to this, and at least one of the alignment films 19 and 29 need only have the second alignment regulation region R2. In the present embodiment, the first and second alignment regulation regions R1 and R2 are arranged such that the boundary B1, B2, B3, B4 between the first and second alignment regulation regions R1 and R2 matches the boundary between the picture-element region and the region other than the picture-element region.

In the LCD 100, the second alignment regulation region R2 is also provided in a part of each picture-element region, in addition to the outside of the picture-element regions. In FIG. 1, the boundary between the first and second alignment regulation regions R1 and R2 provided within the picture-element region is denoted by B5 and B6. It is preferable to provide the second alignment regulation region R2 also within each picture-element region, because this enables the alignment regulation force applied from the second alignment regulation region R2 to the liquid crystal molecules 32b to be efficiently transmitted to the vertically aligned liquid crystal molecules 32a in the first alignment regulation region R1. However, the present invention is not limited to this.

For example, in the case where the picture-element region is small in size, the alignment direction of the liquid crystal molecules 32 within the picture-element region can be regulated stably enough only with the second alignment regulation region R2 provided outside the picture-element regions. In order to obtain sufficiently stable alignment as well as sufficiently rapid response, it is preferable to arrange the first and second alignment regulation regions R1 and R2 such that the distance between adjacent second alignment regulation regions R2 with a corresponding first alignment regulation region R1 therebetween is 100 $\mu$m or less.

More specifically, referring to FIG. 1, it is preferable to arrange the first and second alignment regulation regions R1 and R2 such that all of the following distances W1, W2 and W3 is 100 $\mu$m or less: the distance W1 between the boundary B1 at the gate line 12 and the boundary B3 facing the boundary B1 with the first alignment regulation region R1 therebetween; the distance W2 between the boundary B2 at the source line 14 and the boundary B5 facing the boundary B2 with the first alignment regulation region R1 therebetween; and the distance W3 between the boundary B4 at the source line 14 and the boundary B6 facing the boundary B4 with the first alignment regulation region R1 therebetween. In the case where the distance W1 between the boundaries B1 and B3 as well as the distance W4 between the boundaries B2 and B4 are both 100 $\mu$m or less, the alignment direction of the liquid crystal molecules 32 within the picture-element region can be regulated stably enough only with the second alignment regulation region R2 provided outside the picture-element regions.

Note that, in the specification, a region of the LCD corresponding to a "picture element" (a minimum display unit) is referred to as a "picture-element region". In color LCDs, R (Red), B (Blue) and G (Green) picture elements correspond to a single "pixel". In active-matrix LCDs, a picture-element electrode and a counter electrode facing the picture-element electrode define a picture-element region. The present invention is not limited to the active-matrix LCDs as exemplified in the embodiments. For example, the present invention may be applied to simple-matrix LCDS. The simple-matrix LCD has stripe-shaped column electrodes and row electrodes crossing perpendicular thereto, and each intersection region of the row and column electrodes defines a picture-element region. In the strict sense, in the LCDs having a black matrix, a region corresponding to an opening of the black matrix out of the region to which a voltage is applied depending on the display state corresponds to a picture-element region.

The alignment films 19 and 29 are typically formed from a vertical alignment film material. The alignment film of the first alignment regulation regions R1 is a vertical alignment film formed by a normal method. This vertical alignment film aligns the liquid crystal molecules 32a at a tilt angle of approximately 90° with respect to the surface of the film.

The alignment film of the second alignment regulation regions R2 is also formed from a vertical alignment film material. However, the surface of this alignment film is subjected to a process described below as well as a rubbing process so as to align the liquid crystal molecules 32b at a given tilt angle in a given azimuth direction (arrow HD). More specifically, the liquid crystal molecules 32b are tilted at a tilt angle of 0° to 87° with respect to the surface of the alignment film 19 (29) so as to be aligned in a single direction. It is preferable that the plurality of second alignment regulation regions R2 define the same alignment direction, and that this alignment direction is typically the same across the whole display plane (liquid crystal layer).

Hereinafter, a method for manufacturing the LCD 100 is described with reference to FIG. 3. Among the constituent elements of the LCD 100, the elements other than the alignment films 19 and 29 having the second alignment regulation regions R2 are the same as those of the known LCDs. Therefore, description of the manufacturing method thereof is omitted.

Figure 3:
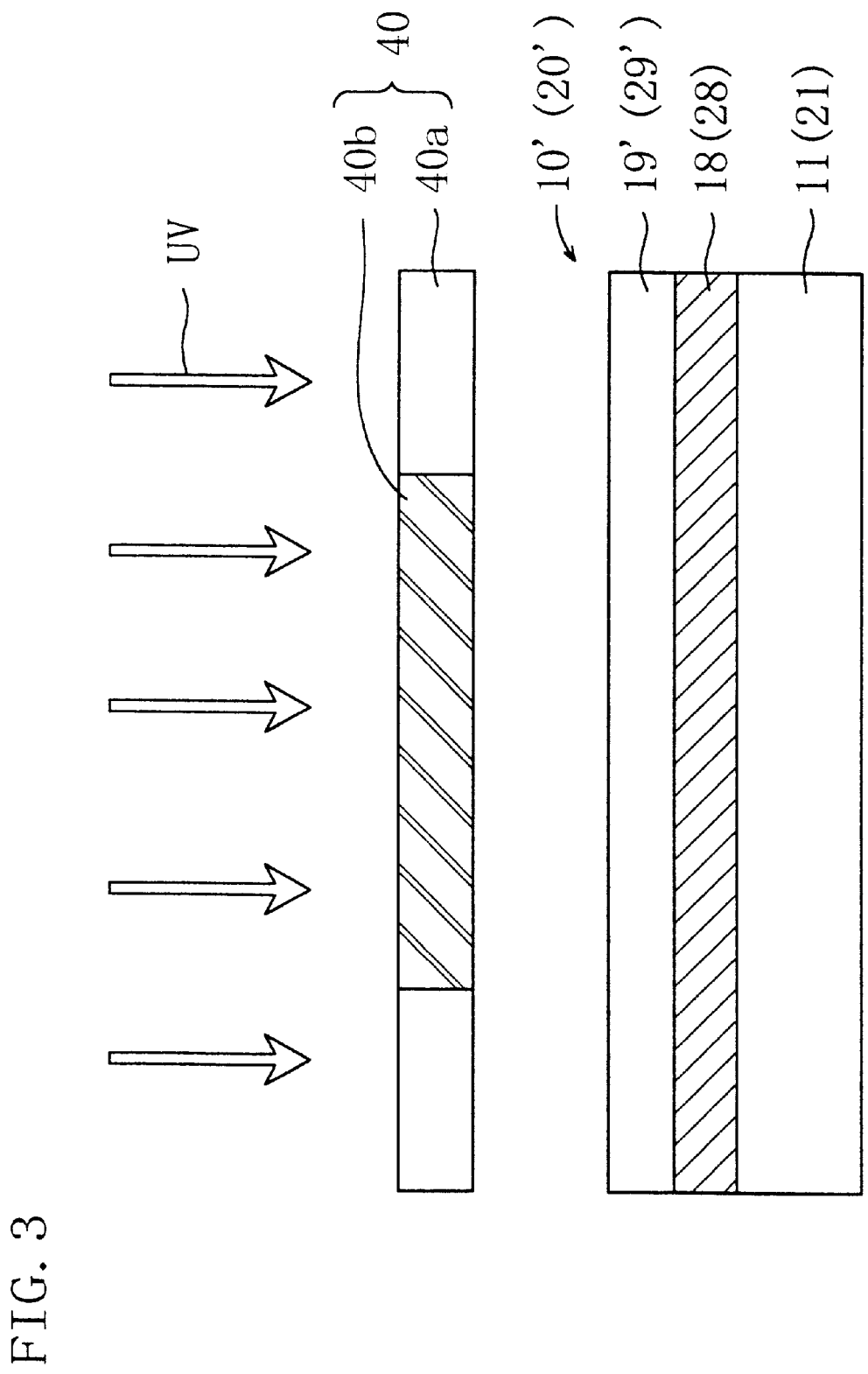
FIG. 3 is a schematic diagram showing the step of applying to a vertical alignment film the alignment regulation force in the azimuth direction according to a method for manufacturing the LCD according to the present invention.

As shown in FIG. 3, a substrate 10' (20') (which will later serve as the TFT substrate 10 and the color filter substrate 20, respectively) having a picture-element electrode 18 (counter electrode 28) formed on the glass substrate 11 (21) is prepared. It should be understood that other elements such as TFTs 16 or color filter layer 27 are formed on the glass substrate 11 (21).

A film 19' (29') of a vertical alignment film material is formed substantially over the whole surface of the substrate 10' (20'). For example, polyimide resin, one of the organic polymer materials, is used as the vertical alignment film material. This vertical alignment film 19' (29') has a property to align the liquid crystal molecules vertically.

UV rays are radiated through a mask 40 onto the vertical alignment film 19' (29') formed at the surface of the substrate 10' (20'). The mask 40 has a light-transmitting portion 40a for transmitting the UV rays therethrough, and a light-shielding portion 40b for blocking them. The light-transmitting portion 40a is provided so as to correspond to the second alignment regulation regions R2 shown in FIG. 1. Accordingly, the UV rays are radiated through the mask 40 onto the regions of the vertical alignment film 19' (29') that will later serve as the second alignment regulation regions R2. The regions irradiated with the UV rays have the alignment regulation force to align the liquid crystal molecules at a tilt angle of 0° to 87° with respect to the surface of the substrates. The tilt angle depends on the UV radiation amount. The tilt angle of 0° to 87° can be obtained by the UV radiation of 0.1 J/cm$^2$ to 30 J/cm$^2$. Thus, a tilt angle is applied to the vertical alignment film by the method other than the rubbing method, that is, by radiation of actinic rays such as UV rays. As a result, the liquid crystal molecules can be stably aligned in the azimuth direction. Moreover, the tilt direction (azimuth direction to which the liquid crystal molecules are tilted) is defined by rubbing the surface of the vertical alignment film 19' (29').

In the present embodiment, the UV rays are radiated onto the whole region other than the picture-element regions as well as onto a part of each picture-element region in order to form the second alignment regulation regions R2 shown in FIG. 1. This UV radiation step may be conducted at any time after formation of the vertical alignment film 19' (29'). More specifically, this step may be conducted right after application of the vertical alignment material or after pre-baking thereof. Alternatively, this step may be conducted after baking or rubbing thereof.

For example, a mask similar to a commonly used photomask may be used as the mask 40. Instead of the UV rays, other energy radiation such as visible light, infrared light and X rays may be used. Laser light having a prescribed wavelength for the alignment film material may alternatively be used. UV rays having a wavelength of 400 nm or less are preferable as actinic rays readily providing high energy for changing the alignment regulation force of the vertical alignment film. The light having such a wavelength can be readily obtained with a high-pressure mercury lamp, a low-pressure mercury lamp, a mercury-xenon lamp, or the like.

The TFT substrate 10 and the color filter substrate 20 thus obtained are laminated together such that their respective second alignment regulation regions face each other. A liquid crystal material is then introduced therein, whereby the LCD 100 is obtained.

The effect of alignment regulation by the second alignment regulation regions R2 provided in the alignment films 19 and 29 was observed up to about 50 μm (within the display plane) from the boundaries B1 to B6 between the first and second alignment regulation regions R1 and R2. In the present embodiment, the width of the picture-element region (corresponding to the distance W4 of FIG. 1) is about 90 μm. Therefore, provision of the second alignment regulation regions R2 in the regions other than the picture-element regions is enough to obtain sufficient alignment regulation force. However, stronger alignment regulation force was able to be obtained by providing the second alignment regulation region R2 also within the picture-element regions.

The arrangement of the second alignment regulation regions R2 in the regions other than the picture-element regions and within the picture-element regions may be different from that shown in the present embodiment. The number of second alignment regulation regions R2 as well as the shape thereof is selected appropriately according to the size of the picture-element regions, strength of the alignment regulation force, and the like. Depending on the size of the picture-element regions, the second alignment regulation region R2 may not be formed within the picture-element regions. The alignment regulation force is increased as the distance between adjacent second alignment regulation regions R2 with a corresponding first alignment regulation region R1 therebetween is reduced. Therefore, in the case where the stronger alignment regulation force is required, the number of second alignment regulation regions R2 need only be increased.

Figure 4:
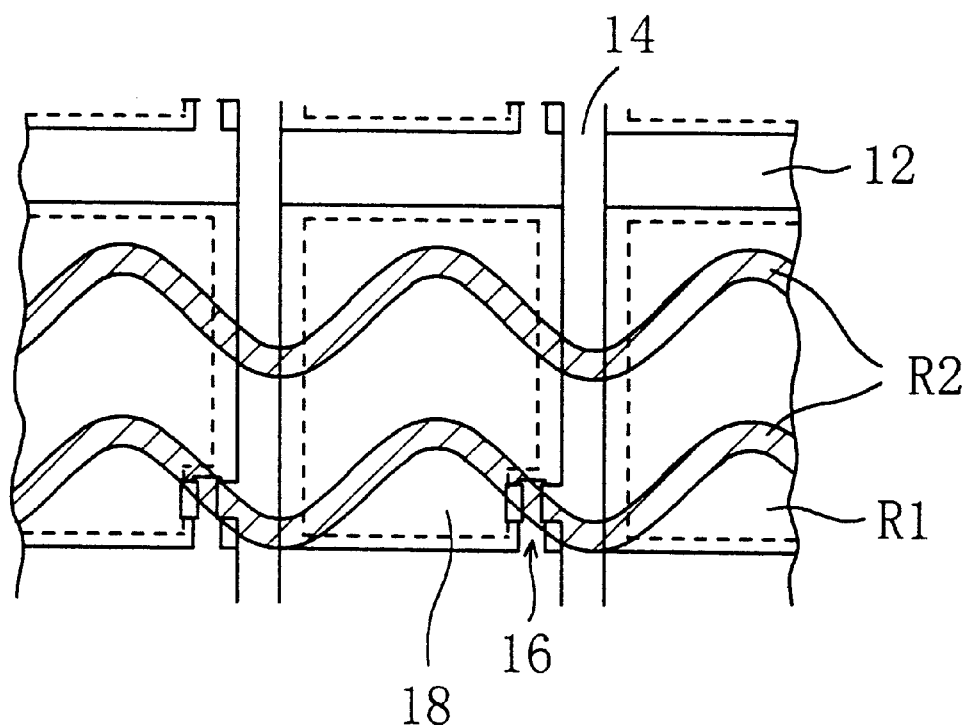
FIG. 4 is a plan view schematically showing the case where a second alignment regulation region R2 of the first embodiment has a wave shape.
Figure 5:
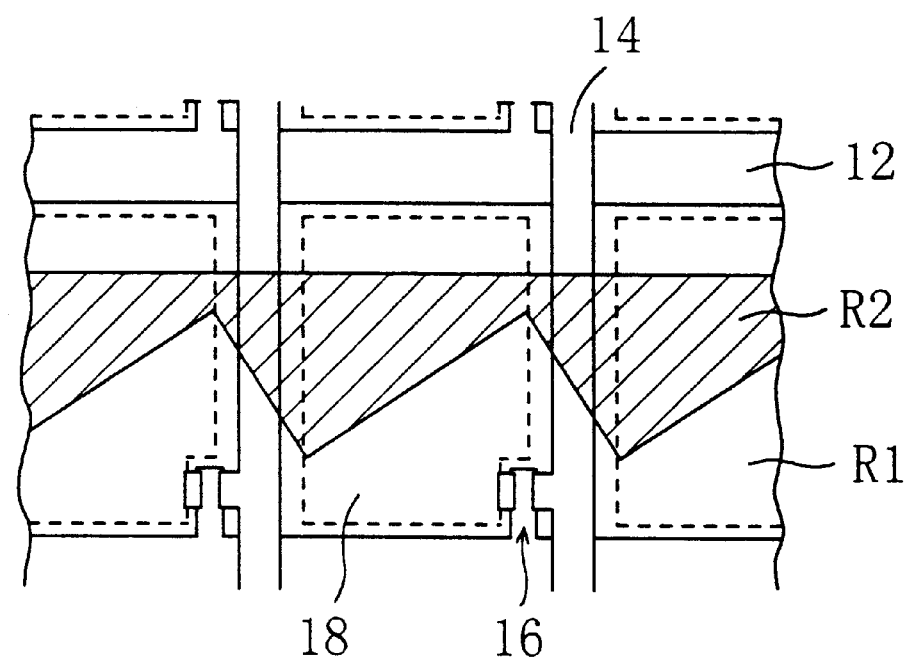
FIG. 5 is a plan view schematically showing the case where the second alignment regulation region R2 of the first embodiment has a saw-tooth shape.
Figure 6:
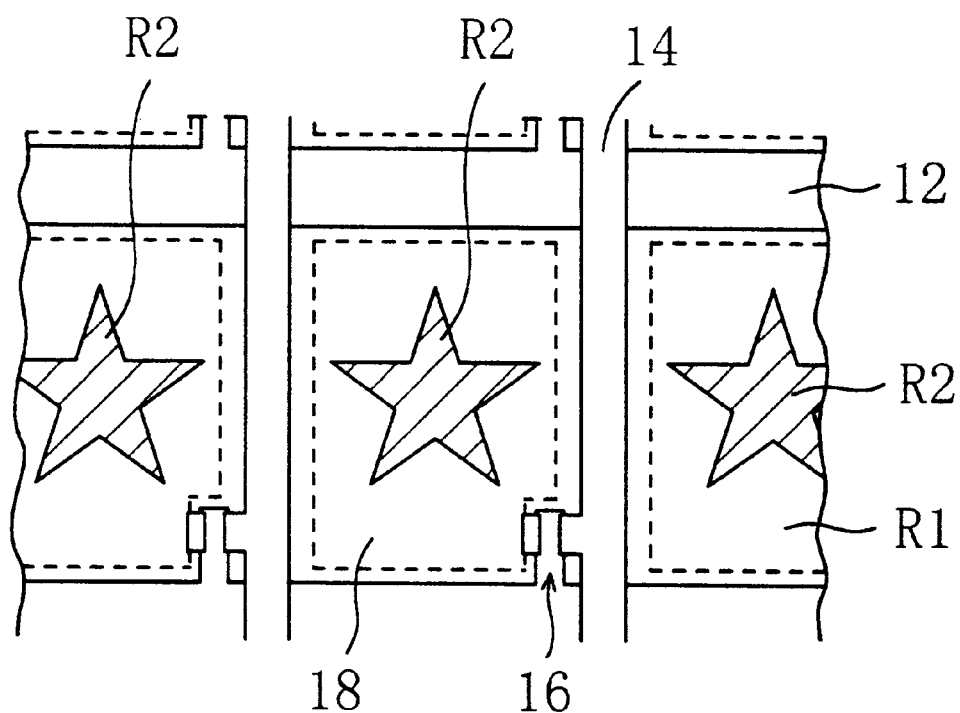
FIG. 6 is a plan view schematically showing the case where the second alignment regulation region R2 of the first embodiment has a star shape.

Note that, in FIG. 1, the second alignment regulation region R2 has a line-shaped stripe. However, the second alignment regulation region R2 may have a wave shape (see FIG. 4), mountain shape, or saw-tooth shape (see FIG. 5). The second alignment regulation region R2 may have such a shape that connects figures of the same shape together, or may have such a shape that connects figures of different shapes together. Alternatively, the second alignment regulation region R2 may have a circular or elliptical shape, polygonal shape such as triangle or quadrangle, or a shape having two-dimensional irregularities such as star shape (see FIG. 6). The same effects can be obtained even with such shapes.

In the region other than the picture-element regions, the area of the second alignment regulation region R2 is selected arbitrarily. Within the picture-element region, the area of the second alignment regulation region R2 is selected so that the total area of the second alignment regulation region R2 within each picture-element region is smaller than a half of the area of the picture-element region. As the area of the second alignment regulation region R2 is increased, their effect on the transmittance and display quality of the LCD is increased. Therefore, it is preferable that the area of the second alignment regulation region R2 within each picture-element region is as small as possible. There is no limitation in the regions other than the picture-element regions.

The second alignment regulation region R2 is required to have a width of at least 10 μm. For example, referring to FIG. 1, each of the following widths W5, W6 and W7 must be at least 10 μm: the width W5 of the second alignment regulation region R2 including the region of the gate line 12; the width W6 of the second alignment regulation region R2 including the region of the source line 14; and the width W7 of the second alignment regulation region R2 provided within the first alignment regulation region R1. If the width of the second alignment regulation region R2 is less than 10 μm, the alignment regulation force is reduced, making it difficult to strongly regulate the alignment direction of the first alignment regulation region R1. Accordingly, the larger width of the second alignment regulation region R2 is more preferable. However, as the width of the alignment regulation region R2 is increased, the amount of light leakage in black display is also increased. Therefore, an appropriate value must be selected.

In the present embodiment, the boundary between the first and second alignment regulation regions R1 and R2 matches the boundary between the picture-element region and the region other than the picture-element region. However, the boundary between the first and second alignment regulation regions R1 and R2 may be displaced either toward the picture-element region or the region other than the picture-element region by 10 μm or less.

In the present embodiment, a mask similar to the photomask is used as the mask 40. However, gathered light may be directed onto a prescribed region without using the mask 40. In the present embodiment, UV rays are radiated to the surface of the vertical alignment film 19 (29') in order to form the second alignment regulation regions R2. However, actinic rays (energy radiation) such as electron beams, ion beams, X rays may alternatively be radiated thereto.

In the present embodiment, the second alignment regulation regions R2 are formed on both substrates 10 and 20 of the LCD such that the respective second alignment regulation regions R2 face each other with the liquid crystal layer 30 interposed therebetween. However, the second alignment regulation regions R2 may be formed on only one of the substrates (10 or 20) so as to face the first alignment regulation regions R1. Alternatively, the second alignment regulation regions R2 may be divided between both substrates. More specifically, a part of the second alignment regulation regions R2 may be formed on one substrate, and the remainder may be formed on the other substrate. Stronger alignment regulation force is obtained when the second alignment regulation regions R2 are formed on both substrates. However, sufficient alignment regulation force is obtained even when the second alignment regulation regions R2 are formed only on one substrate.

(Embodiment 2)

Figure 7:
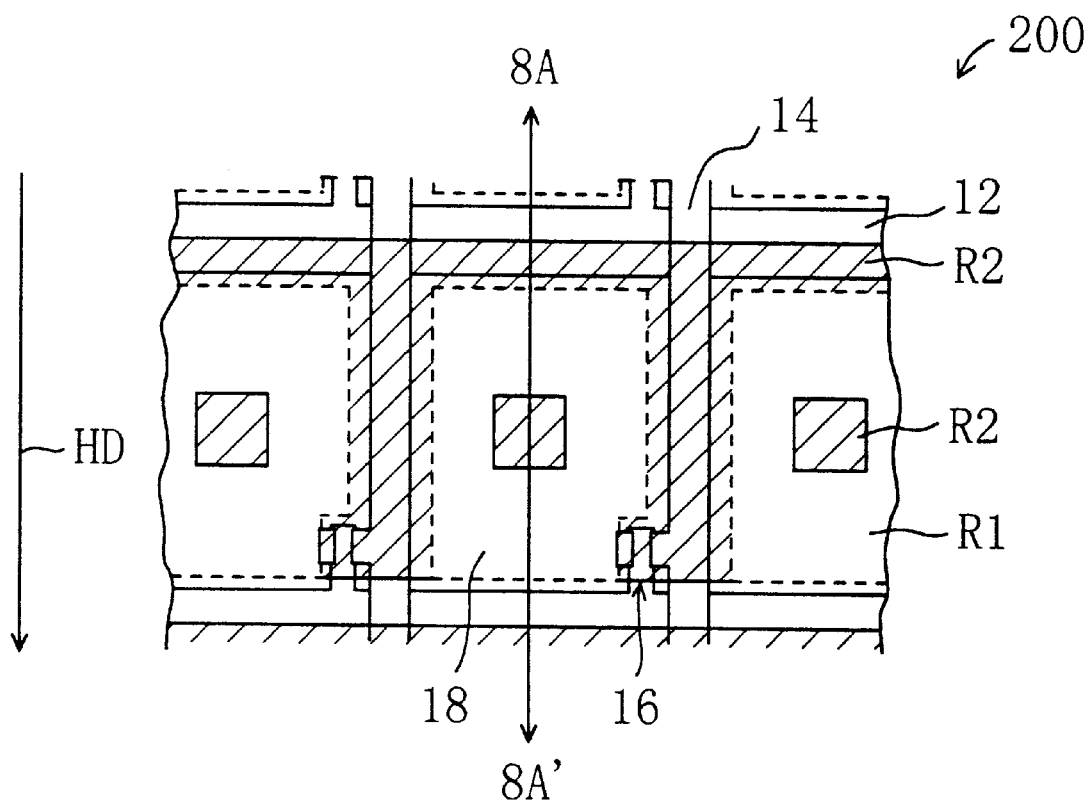
FIG. 7 is a plan view schematically showing picture-element regions of an LCD according to a second embodiment of the present invention.
Figure 8:
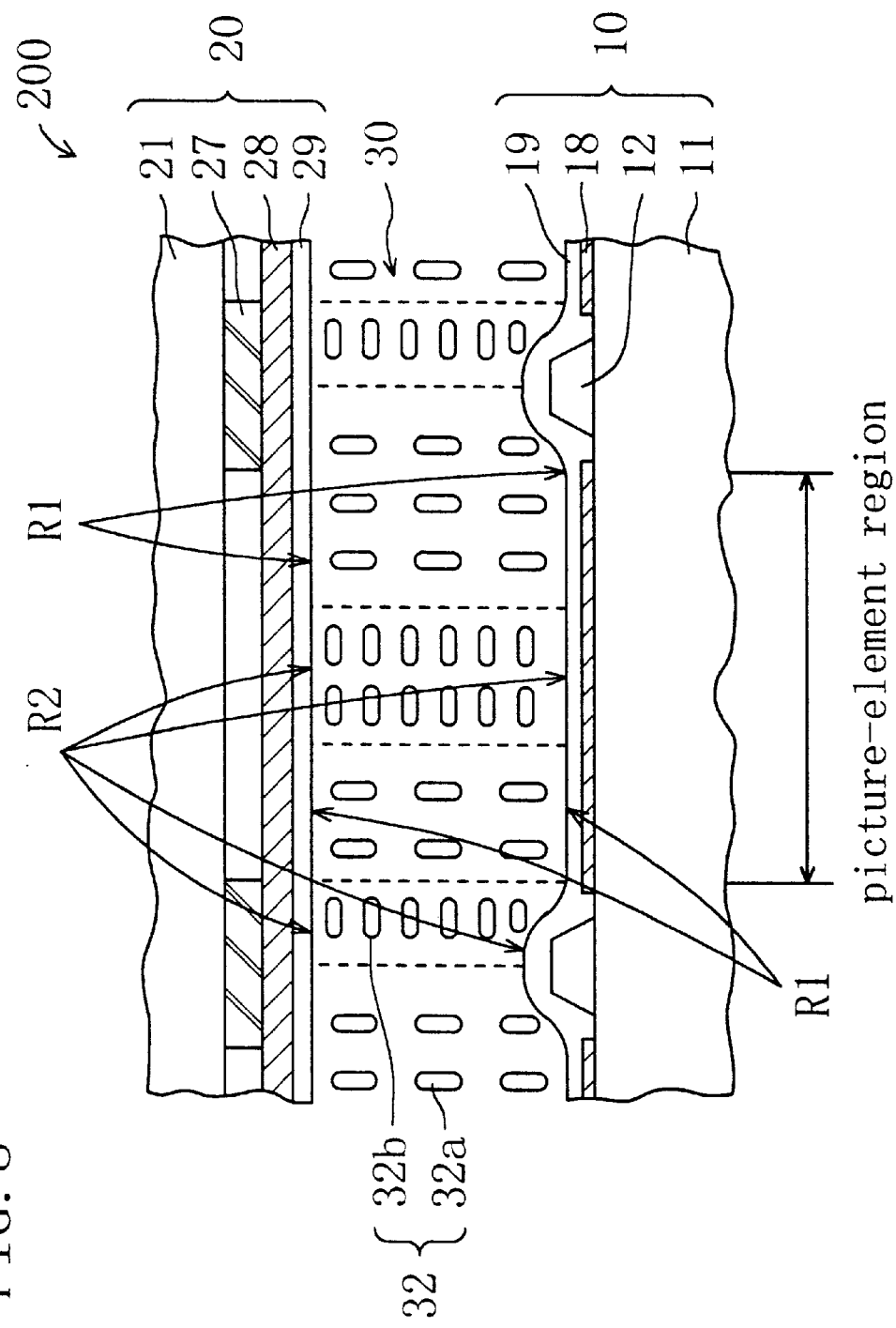
FIG. 8 is a cross-sectional view schematically showing the picture-element region of the LCD according to the second embodiment of the present invention.

FIG. 7 schematically shows a planar structure of picture-element regions of a vertical alignment mode LCD 200 according to the second embodiment. FIG. 8 schematically shows a cross-sectional structure of the picture-element region of the LCD 200. FIG. 8 corresponds to a cross-sectional view taken along line 8A–8A' of FIG. 7. Both figures show the state when a voltage is not applied. Note that, regarding the LCD 200, description of the structure substantially the same as that of the LCD 100 of the first embodiment is omitted.

The LCD 200 is different from the LCD 100 in arrangement of the second alignment regulation regions R2. In the LCD 200 as well, the second alignment regulation regions R2 are provided on both of the TFT substrate 10 and the color filer substrate 20 such that the respective second alignment regulation regions R2 face each other with the liquid crystal layer 30 interposed therebetween. Like the first embodiment, however, the present invention is not limited to this.

Each of the alignment films 19 and 29 of the LCD 200 has an island-shaped quadrangular second alignment regulation region R2 within each picture-element region. The second alignment regulation region R2 is not formed in a region where the tilt direction of the liquid crystal molecules 32 due to the alignment regulation force of the second alignment regulation region R2 is the same as that of the liquid crystal molecules 32 due to the electric field generated between the picture-element electrode 18 and the gate line 12 (i.e., in the vicinity of the lower side of each picture-element region in FIG. 7). In other words, the alignment regulation force of the electric field can be used in this region.

Note that, in FIG. 7, the second alignment regulation region R2 formed within each picture-element region has a quadrangular shape. However, the second alignment regulation region R2 may be a stripe of line shape, wave shape, mountain shape, or saw-tooth shape. The second alignment regulation region R2 may have such a shape that connects figures of the same shape together, or may have such a shape that connects figures of different shapes together. Alternatively, the second alignment regulation region R2 may have a circular or elliptical shape, polygonal shape such as triangle or hexagon, or a shape having two-dimensional irregularities such as star shape. The same effects can be obtained even with such shapes.

Note that, as described in the first embodiment, in the region other than the picture-element regions, the area of the second alignment regulation region R2 is selected arbitrarily. Within the picture-element region, the area of the second alignment regulation region R2 is selected so that the total area of the second alignment regulation region R2 within each picture-element region is smaller than a half of the area of the picture-element region. As the area of the second alignment regulation region R2 is increased, their effect on the transmittance and display quality of the LCD is increased. Therefore, it is preferable that the area of the second alignment regulation region R2 within each picture-element region is as small as possible. There is no limitation in the regions other than the picture-element regions.

As in the first embodiment, the second alignment regulation region R2 is required to have a width of at least 10 $\mu$m. For example, in FIG. 7, the second alignment regulation region R2 provided within the picture-element region is required to have a width of at least 10 $\mu$m. The larger width of the second alignment regulation region R2 is more preferable. However, as the width of the second alignment regulation region R2 is increased, the amount of light leakage in black display is also increased. Therefore, an appropriate value must be selected.

The second alignment regulation region R2 can be formed by the same method as that described in the first embodiment. In the second embodiment as well, UV radiation is conducted in the range of 0.1 J/cm$^2$ to 30 J/cm$^2$ so that the tilt angle of the liquid crystal molecules 32b with respect to the surface of the alignment film 19, 29 falls within the range of 0° to 87° (within the range of 3° to 90° from the normal direction). The tilt angle of the liquid crystal molecules 32a in the first alignment regulation region R1 is also approximately 90° as in the first embodiment.

The effect of alignment regulation by the second alignment regulation regions R2 provided in the alignment films 19 and 29 was observed up to about 50 $\mu$m (within the display plane) from the boundary between the first and second alignment regulation regions R1 and R2. In the present embodiment, stronger alignment regulation force was able to be obtained by providing the second alignment regulation region R2 also within the picture-element regions.

In the present embodiment, the boundary between the first and second alignment regulation regions R1 and R2 partially matches the boundary between the picture-element region and the region other than the picture-element region. However, the boundary between the first and second alignment regulation regions R1 and R2 may be displaced either toward the picture-element region or the region other than the picture-element region by 10 $\mu$m or less. Note that, as described in the first embodiment, the arrangement of the second alignment regulation region R2 is not limited to the above examples, and various modifications are possible.

(Embodiment 3)

Figure 9:
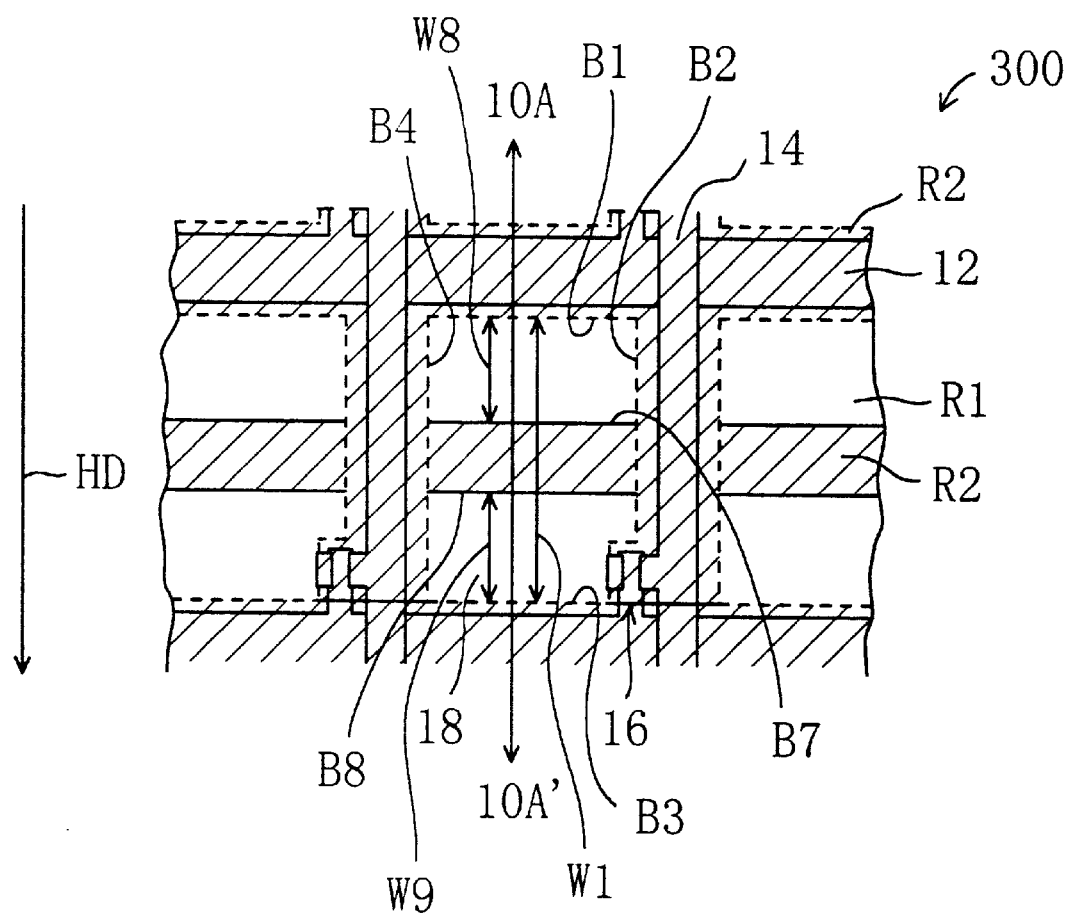
FIG. 9 is a plan view schematically showing picture-element regions of an LCD according to a third embodiment of the present invention.
Figure 10:
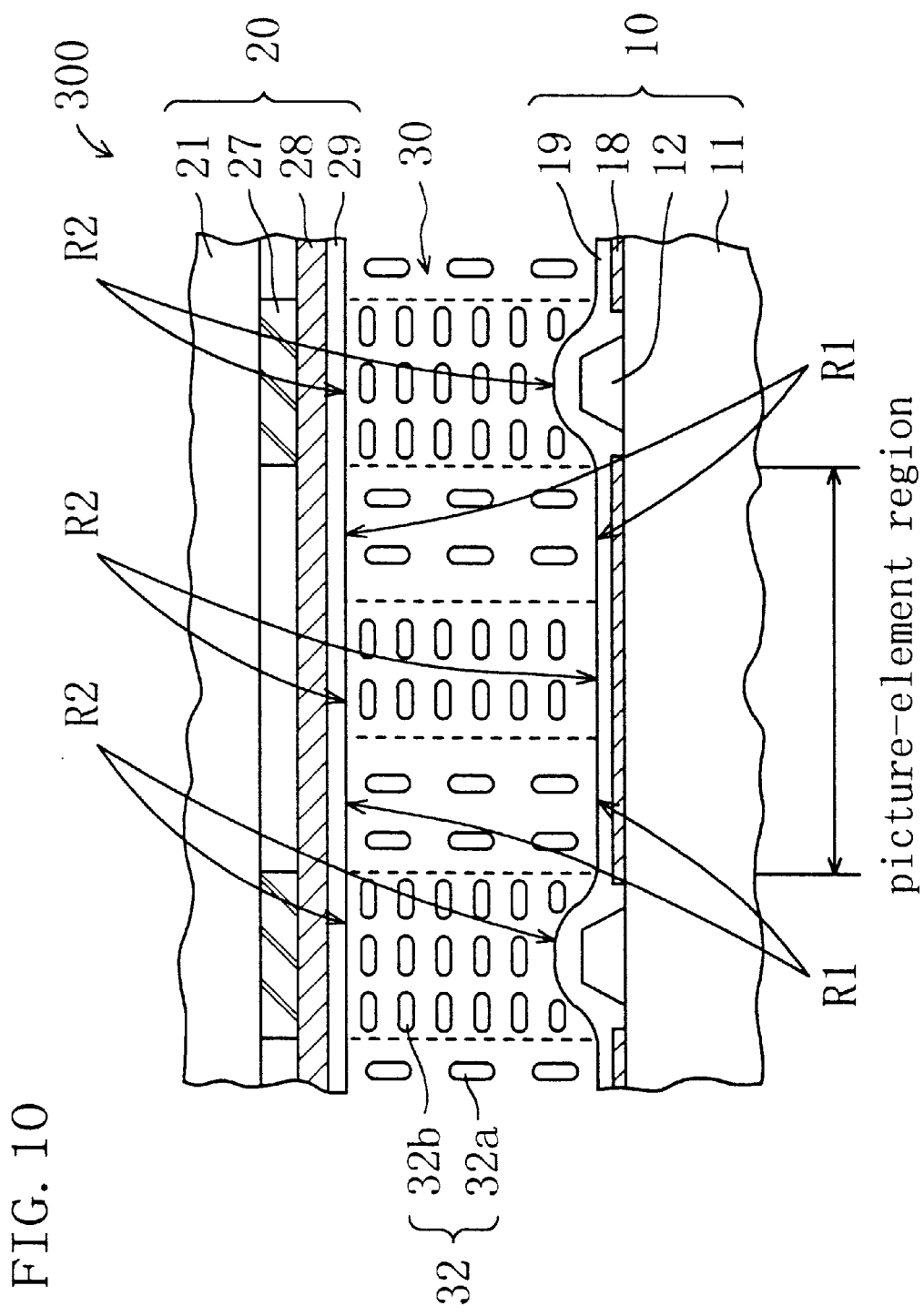
FIG. 10 is a cross-sectional view schematically showing the picture-element region of the LCD according to the third embodiment of the present invention.
Figure 11:
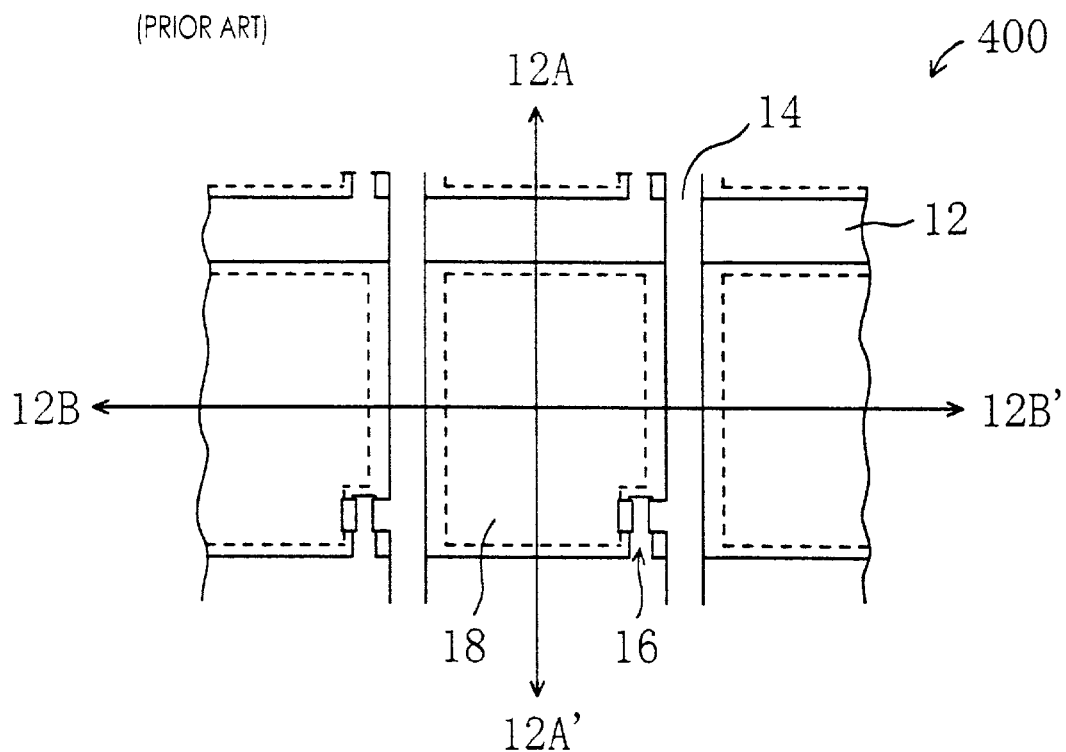
FIG. 11 is a plan view schematically showing picture-element regions of a conventional vertical alignment LCD.
Figure 12:
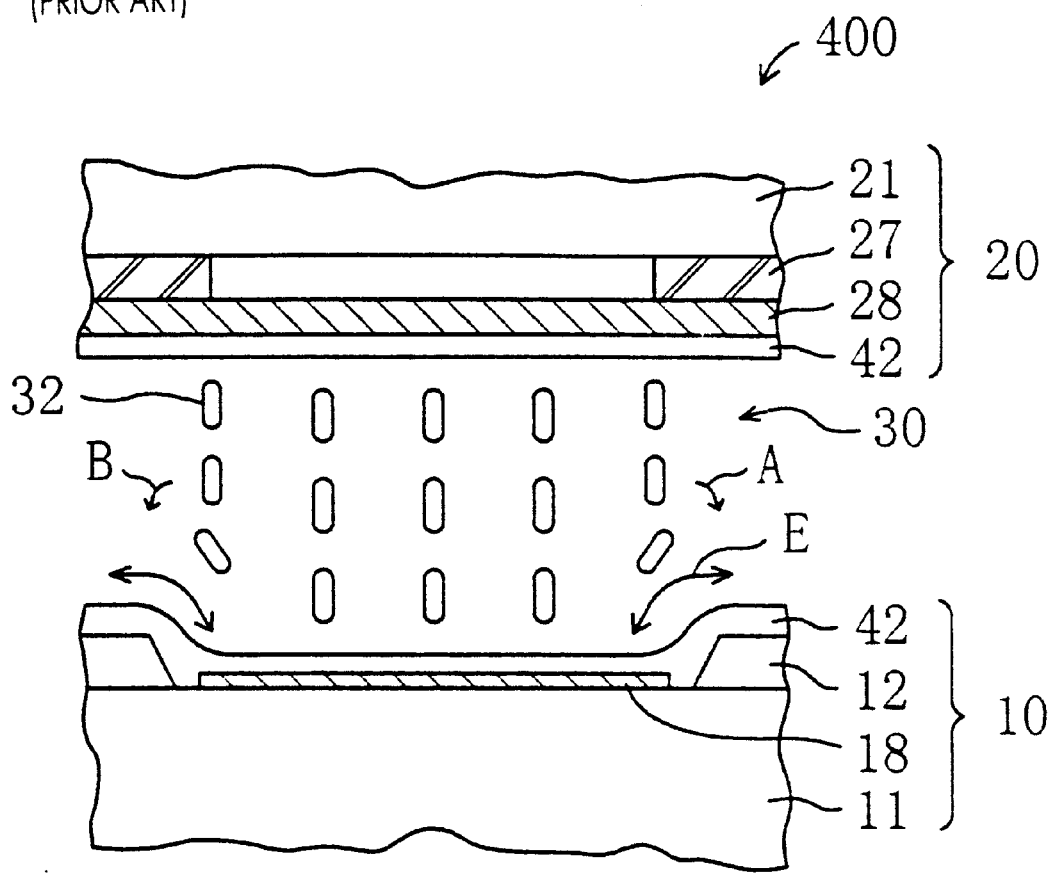
FIG. 12 is a cross-sectional view schematically showing the picture-element region of the LCD of FIG. 11.

FIG. 9 schematically shows a planar structure of picture-element regions of a vertical alignment mode LCD 300 according to the third embodiment. FIG. 10 schematically shows a cross-sectional structure of the picture-element region of the LCD 300. FIG. 10 corresponds to a cross-sectional view taken along line 10A–10A' of FIG. 9. Both figures show the state when a voltage is not applied. Note that, regarding the LCD 300, description of the structure substantially the same as that of the LCD 100 of the first embodiment is omitted.

The LCD 300 is different from the LCD 100 in arrangement of the second alignment regulation regions R2. In the LCD 300 as well, the second alignment regulation regions R2 are provided on both of the TFT substrate 10 and the color filer substrate 20 such that the respective second alignment regulation regions R2 face each other with the liquid crystal layer 30 interposed therebetween. Like the first embodiment, however, the present invention is not limited to this.

As in the first embodiment, each of the alignment films 19 and 29 of the LCD 300 has a first alignment regulation region R1 provided within each picture-element region for aligning the liquid crystal molecules 32a of the liquid crystal layer 30 approximately vertically, and a second alignment regulation region R2 provided outside the picture-element regions for aligning the liquid crystal molecules 32b in a single azimuth direction (arrow HD). In this embodiment, like the first embodiment, the first and second alignment regulation regions R1 and R2 are arranged such that the boundary B1, B2, B3, B4 between the first and second alignment regulation regions R1 and R2 matches the boundary between the picture-element region and the region other than the picture-element region.

Each of the alignment films 19 and 29 of the LCD 300 has a line-shaped second alignment regulation region R2 approximately in the center of each picture-element region. This line-shaped alignment regulation region R2 is a region connecting the boundary B2 and the opposing boundary B4. In FIG. 9, the boundary between the first and second alignment regulation regions R1 and R2 provided within the picture-element region is denoted by B7 and B8. As in the first embodiment, the second alignment regulation region R2 is required to have a width of at least 10 µm.

In the present embodiment, the line-shaped second alignment regulation region R2 connecting the boundary B2 and the opposing boundary B4 is provided approximately in the center of each picture-element region. Therefore, excellent alignment regulation force was able to be obtained. In other words, even when the distance W1 between the boundaries B1 and B3 is about 200 µm, both the distance W8 between the boundary B1 and the opposing boundary B7 and the distance W9 between the boundary B3 and the opposing boundary B8 are 100 µm or less. Therefore, the distance from any point within the first alignment regulation region R1 surrounded by the second alignment regulation region R2 to the second alignment regulation region R2 is 50 µm or less (within the display plane). Thus, the alignment regulation force of the second alignment regulation region R2 well reaches the liquid crystal molecules within the first alignment regulation region R1, whereby sufficiently rapid response can be obtained.

Note that, like the first embodiment, the shape of the second alignment regulation region R2 formed within the picture-element region is not limited to the line shape shown in FIG. 9, but may have another shape. Moreover, regarding the area, width and arrangement of the second alignment regulation region R2 as well as the method for forming it are the same as those described in the first embodiment, and various modifications are also possible.

According to the present invention, at least one of the alignment films of the vertical alignment mode LCD has an alignment regulation region provided within each picture element region for aligning the liquid crystal molecules approximately vertically, and an alignment regulation region provided outside the picture-element regions for aligning the liquid crystal molecules in a single azimuth direction. As a result, a vertical alignment mode LCD having uniform, high display quality can be obtained.

Moreover, according to the present invention, the alignment regulation region for regulating alignment of the liquid crystal molecules in the azimuth direction can be formed by merely selectively applying a relatively simple process to the vertical alignment film. Therefore, increase in the number of manufacturing processes is minimized, so that the vertical alignment mode LCD can be manufactured with improved efficiency over the conventional examples.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. A liquid crystal display device, comprising:
   a pair of substrates;
   a liquid crystal layer provided between the pair of substrates;
   an electrode for applying a voltage to the liquid crystal layer; and
   a pair of alignment films formed on respective surfaces of the pair of substrates which face the liquid crystal layer, the liquid crystal display device having a plurality of picture-element regions for providing display, wherein
   at least one of the pair of alignment films has a first alignment regulation region provided within each of the plurality of picture-element regions for aligning liquid crystal molecules of the liquid crystal layer approximately vertically, and a second alignment regulation region provided outside the plurality of picture-element regions for aligning the liquid crystal molecules of the liquid crystal layer in a single azimuth direction.

2. The liquid crystal display device according to claim 1, wherein the liquid crystal molecules in the first alignment regulation region has a tilt angle in a range of 88° to 90° with respect to a surface of the at least one alignment film, and the liquid crystal molecules in the second alignment regulation region has a tilt angle in a range of 0° to 87° with respect to the surface of the at least one alignment film.

3. The liquid crystal display device according to claim 1, wherein the at least one alignment film further has the second alignment regulation region within each of the plurality of picture-element regions.

4. The liquid crystal display device according to claim 1, wherein the second alignment regulation region is arranged such that a distance from any point within the first alignment regulation region to the second alignment regulation region is 50 µm or less.

5. The liquid crystal display device according to claim 1, wherein the second alignment regulation region is arranged such that a distance to an adjacent second alignment regulation region with a corresponding first alignment regulation region interposed therebetween is 100 µm or less.

6. The liquid crystal display device according to claim 1, wherein the at least one alignment film has a plurality of second alignment regulation regions, and each of the plurality of second alignment regulation regions defines the same single azimuth direction.

7. The liquid crystal display device according to claim 1, wherein both of the pair of alignment films have the first and second alignment regulation regions, and the second alignment regulation region of one of the alignment films is arranged so as to face the second alignment regulation region of the other alignment film with the liquid crystal layer interposed therebetween.

* * * * *

UNITED STATES PATENT AND TRADEMARK OFFICE
CERTIFICATE OF CORRECTION

PATENT NO. : 6,323,926 B2
DATED : November 27, 2001
INVENTOR(S) : Watanabe et al.

It is certified that error appears in the above-identified patent and that said Letters Patent is hereby corrected as shown below:

<u>Title page,</u>
Item [30], the first priority date should read -- Mar. 31, 2000 --

Signed and Sealed this

Twenty-fifth Day of June, 2002

Attest:

Attesting Officer

JAMES E. ROGAN
*Director of the United States Patent and Trademark Office*